United States Patent [19]

Stritzel

[11] Patent Number: 4,512,211
[45] Date of Patent: Apr. 23, 1985

[54] DIFFERENTIAL ASSEMBLY HAVING MEANS FOR LOCKING AND POSITIONING AXLE SHAFTS THEREIN

[75] Inventor: Gene A. Stritzel, Rochester, N.Y.

[73] Assignee: The Gleason Works, Rochester, N.Y.

[21] Appl. No.: 475,574

[22] Filed: Mar. 15, 1983

[51] Int. Cl.³ .......................... F16H 1/38; F16H 1/42
[52] U.S. Cl. ........................................ 74/745; 74/714
[58] Field of Search ............... 29/434; 74/710, 710.5, 74/711, 713, 714, 715

[56] References Cited

U.S. PATENT DOCUMENTS

| | | | |
|---|---|---|---|
| 1,874,646 | 8/1932 | Skinner | 74/713 X |
| 2,070,569 | 2/1937 | Asam | 74/715 |
| 2,203,683 | 6/1940 | Frederickson | 74/715 |
| 2,230,338 | 2/1941 | Shaw | 74/714 X |
| 2,651,215 | 9/1953 | Schoenrock | 74/714 X |
| 2,720,796 | 10/1955 | Schou | 74/711 |
| 2,855,805 | 10/1958 | Fallon | 74/711 |
| 2,859,641 | 11/1958 | Gleasman | 74/715 |
| 2,972,265 | 2/1961 | Walter | 74/714 X |
| 3,008,350 | 11/1961 | Misener | 74/710.5 |
| 3,237,483 | 3/1966 | Kelley et al. | 74/715 |
| 3,375,736 | 4/1968 | Saari | 74/711 |
| 3,400,611 | 9/1968 | Engle | 74/710.5 |
| 3,494,226 | 2/1970 | Biddle | 74/711 |
| 3,527,120 | 9/1970 | Duer et al. | 74/711 |
| 3,706,239 | 12/1972 | Myers | 74/715 |
| 3,735,647 | 5/1973 | Gleasman | 74/715 |
| 3,849,862 | 11/1974 | Benjamin | 74/715 X |
| 3,874,250 | 4/1975 | Duer et al. | 74/711 |
| 3,875,824 | 4/1975 | Benjamin | 74/715 |
| 3,884,096 | 5/1975 | Gleasman | 74/715 |
| 3,893,351 | 7/1975 | Banemor | 74/710.5 |
| 3,902,237 | 9/1975 | Benjamin | 74/715 |
| 4,162,637 | 7/1979 | Altmann | 74/711 |
| 4,191,071 | 3/1980 | Gleasman et al. | 74/715 X |
| 4,245,525 | 1/1981 | LeBegue | 74/711 |
| 4,269,086 | 5/1981 | Altmann | 74/710.5 X |
| 4,365,524 | 12/1982 | Dissett et al. | 74/715 |

Primary Examiner—Allan D. Herrmann
Assistant Examiner—Stephen B. Andrews
Attorney, Agent, or Firm—Ralph E. Harper; Morton A. Polster

[57] ABSTRACT

A spacing member 40 is of a special design for use with a differential assembly having drive gears 26 and 26, in the form of worm gears, which are operatively connected to each other through sets of transfer gears 34 and 36, having worm wheel portions 37 for meshing with respective drive gears 26 and 28. The spacing member 40 is made up of a number of pieces for ease of installation and removal and is provided with a mounting element 42 which functions to secure the spacing element in a preferred position between the innermost ends of axle segments 12 and 14. The mounting element 42 is provided with a bore 43 for receiving a journal pin 44 associated with an intermediate gear 38 position between a pair of transfer gears 34 and 36.

9 Claims, 4 Drawing Figures

DIFFERENTIAL ASSEMBLY HAVING MEANS FOR LOCKING AND POSITIONING AXLE SHAFTS THEREIN

TECHNICAL FIELD

The present invention relates generally to differential assemblies for use in dividing and interlocking driving action from a drive train to separate axle shafts which are connected to the differential assembly. More specifically, the invention is concerned with an improved way for locking and positioning a pair of axle ends within a differential assembly.

BACKGROUND ART

It is known in the art of designing drive trains for motor vehicles, such as automobiles and trucks, to provide for differential action between driving wheels carried at opposite ends of an axle assembly of the vehicle. Typically, the axle is divided into two parts with inner ends of the separate axle parts splined to drive gears contained within a differential assembly. The differential assembly, in turn, contains an arrangement of gearing which permits driving action to be delivered through the assembly and to the separate drive gears in accordance with preferred modes of operation for various driving conditions. It is also known to provide for a locking of the ends of the separate axle parts within the differential assembly itself through the use of locking rings (or C-shaped fasteners) which are fitted within annular grooves formed near the ends of the axles. In order to assemble separate axle ends into a standard differential assembly, it is necessary to provide for some relative motion between the axle and the differential case so that each axle end can be inserted within the differential case for a sufficient distance to expose the locking ring groove associated with the axle end. Once the locking ring is installed in place, the axle part is then pulled outwardly from the differential case to a position where it is maintained for normal driving operation. When this is done for both axle parts of the drive assembly, it is necessary to insert some means for maintaining the two axle ends in their outwardly disposed positions so as to prevent axial movement of the axles and to maintain the locking rings within a captured position. Standard differential assemblies which use bevel gears as the drive gears for the axle sections can use a large pin or shaft for maintaining the two axle ends in a spaced apart condition once the locking rings have been installed and the axle parts have been moved to their operating positions. Prior patents showing such arrangements include U.S. Pat. Nos. 3,400,611; 3,527,120; and 3,874,250.

The installation of a differential mechanism, other than a bevel gear type of mechanism, in an axle housing presents a different problem for maintaining correct spacing between the axle ends if the differential is of a type that does not include a shaft or a pin disposed along an axis that intersects the common axis of the axles. An example of such a differential assembly is disclosed in U.S. Pat. No. 2,859,641 of Nov. 11, 1958 in the name of Gleasman, which patent is hereby incorporated by reference for purposes of describing specific details of a type of differential assembly which does not utilize bevel gears for obtaining differential action in a drive train. The patent discloses a mechanism termed a "cross axis compound planetary gear complex". This type of differential includes worm gears coupled to each axle end as drive gears together with so called "balancing" gears or transfer gears associated with each of the worm drive gears and in mesh with each other for transferring and dividing torque between the axle ends. The transfer gears are mounted in pairs, and each transfer gear of a pair rotates on an axis of rotation that is substantially tangental to the pitch of an associated axle drive gear. With the specific type of arrangement disclosed in the aforesaid Gleasman patent, it is not feasible to provide a shaft between the axle drive gears to maintain the ends of the axles in spaced apart positions because such a shaft would interfere with the positions of the transfer gears carried by the assembly. In order to provide for correct spacing of the axle ends within the Gleasman type of differential assembly, spacing blocks have been designed for insertion between the axle ends when a bifurcated thrust member is removed from one end of the assembly (as disclosed in co-pending application Ser. No. 475526 entitled "Differential Gearing Assembly" and filed even date herewith in the name of Vernon E. Gleasman) or when an idler gear means, positioned between a pair of transfer gears, is removed for providing access to the central part of the differential assembly for insertion of a bifurcated spacing block (as disclosed in co-pending application Ser. No. 475528 entitled "Differential Gearing Assembly", filed even date herewith, in the name of Vernon E. Gleasman).

In the latter arrangement, an intermediate idler gear is arranged to not only drivingly connect a pair of transfer gears but also to span an access opening formed in the differential case so that removal of the intermediate gear opens a clearance space between all gear components which is sufficient for a spacing block to be installed and removed from the differential case. In this arrangement the intermediate gearing comprises spur gear elements mounted on a journal pin for meshing engagement with spur gear portions of each of the pair of transfer gears associated therewith. The journal pin is arranged for easy removal and installation relative to the differential case and serves to fix the position of the intermediate idler gear relative to the differential case.

DISCLOSURE OF THE INVENTION

The present invention is concerned with a specific improvement for the Gleasman type of differential assembly discussed above which does not utilize bevel gears as drive gears and which uses transfer gears that tend to interfere with an easy placement of a spacing means for maintaining the axle ends in their required operating positions. Specifically, the invention provides for an improved spacing member which can be removably installed between axle ends in such a differential assembly so as to define a predetermined spacing between the axle ends and to maintain the axle ends in their preferred locked positions for operation.

According to a preferred embodiment of the invention, the spacing member is provided with a mounting element projecting radially outwardly therefrom for securing the spacing member in its installed position between the axle ends within the differential case. The mounting element includes a bore therethrough which is at a right angle to and offset from the common center axis of the axle ends, and this permits the mounting element to be secured by the same journal pin which carries an intermediate idler gear across an access opening of the differential case, as described above. Thus, there is provided a securing means for fixing the position of the spacing member from outside of the differential case. In addition, the mounting element serves as a device by which the spacing member can be grasped as it is inserted or removed from the interior of the differential case.

In a further specific embodiment of the invention, the spacing member comprises a two piece structure formed by a splitting of the spacing member in a plane which generally passes through the common center axis of the axle ends and which is perpendicular to the center axis of the bore of the mounting element attached thereto. This provides for two smaller elements which can be readily removed from the differential case but which each include a mounting element portion having a bore therethrough so that the separate elements can be held together in an installed position when the bores of the two elements are aligned and a journal pin is placed therethrough.

A further feature of the spacing member of the present invention provides for additional spacing elements for positioning between the main spacing member and each axle end. Each such additional spacing element is shaped to embrace an end portion of an associated axle end so as to contain a locking ring carried by the axle end when the additional spacing element is inserted between the axle end and the main spacing member.

These and other features and advantages of the invention will become apparent in the more detailed discussion which follows. In that discussion reference will be made to the accompanying drawings as briefly described below.

DETAILED DESCRIPTION OF A PREFERRED EMBODIMENT OF THE INVENTION

Figure 1:
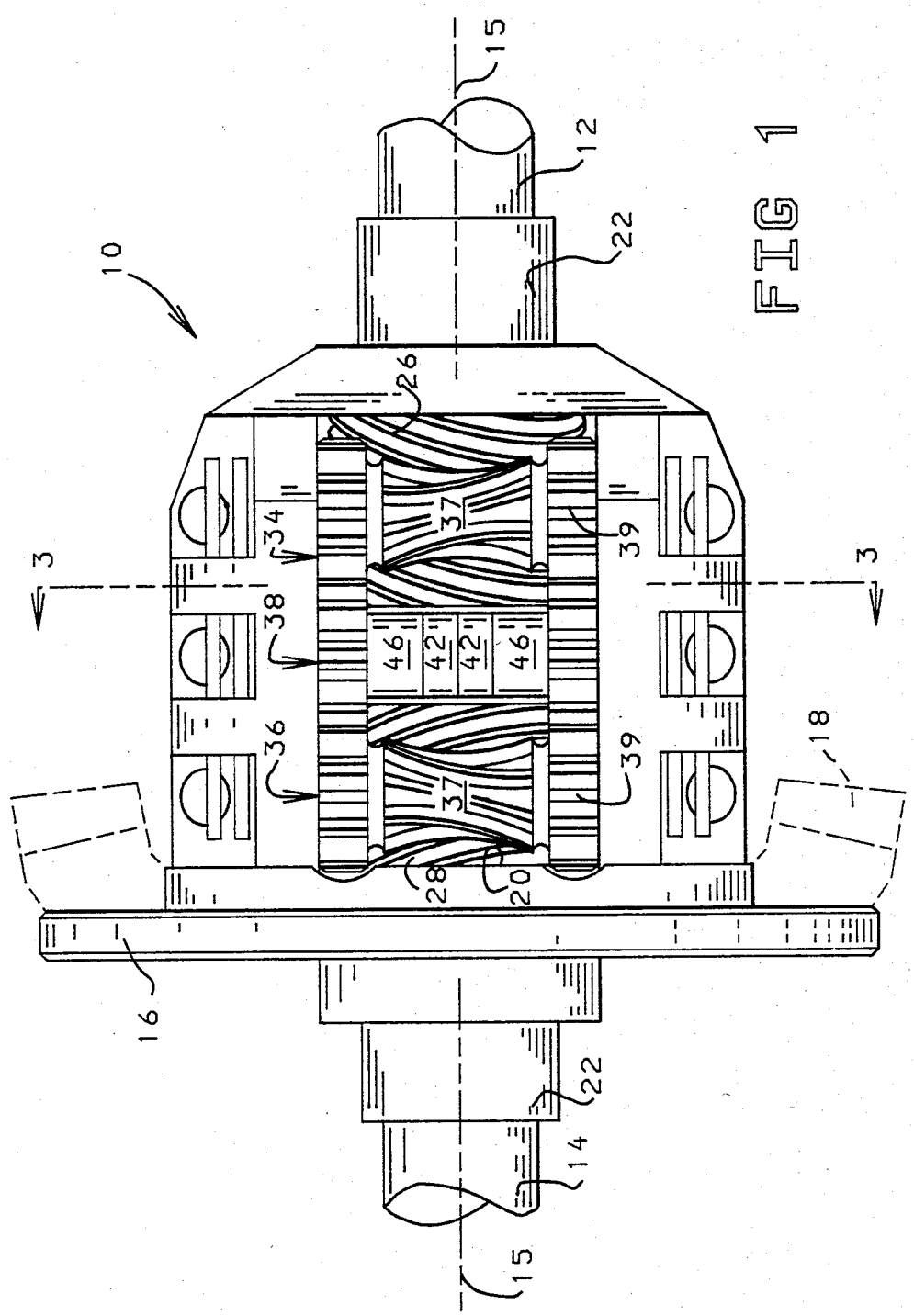
FIG. 1 is an elevational view of a type of differential assembly which is the subject of this invention.
Figure 2:
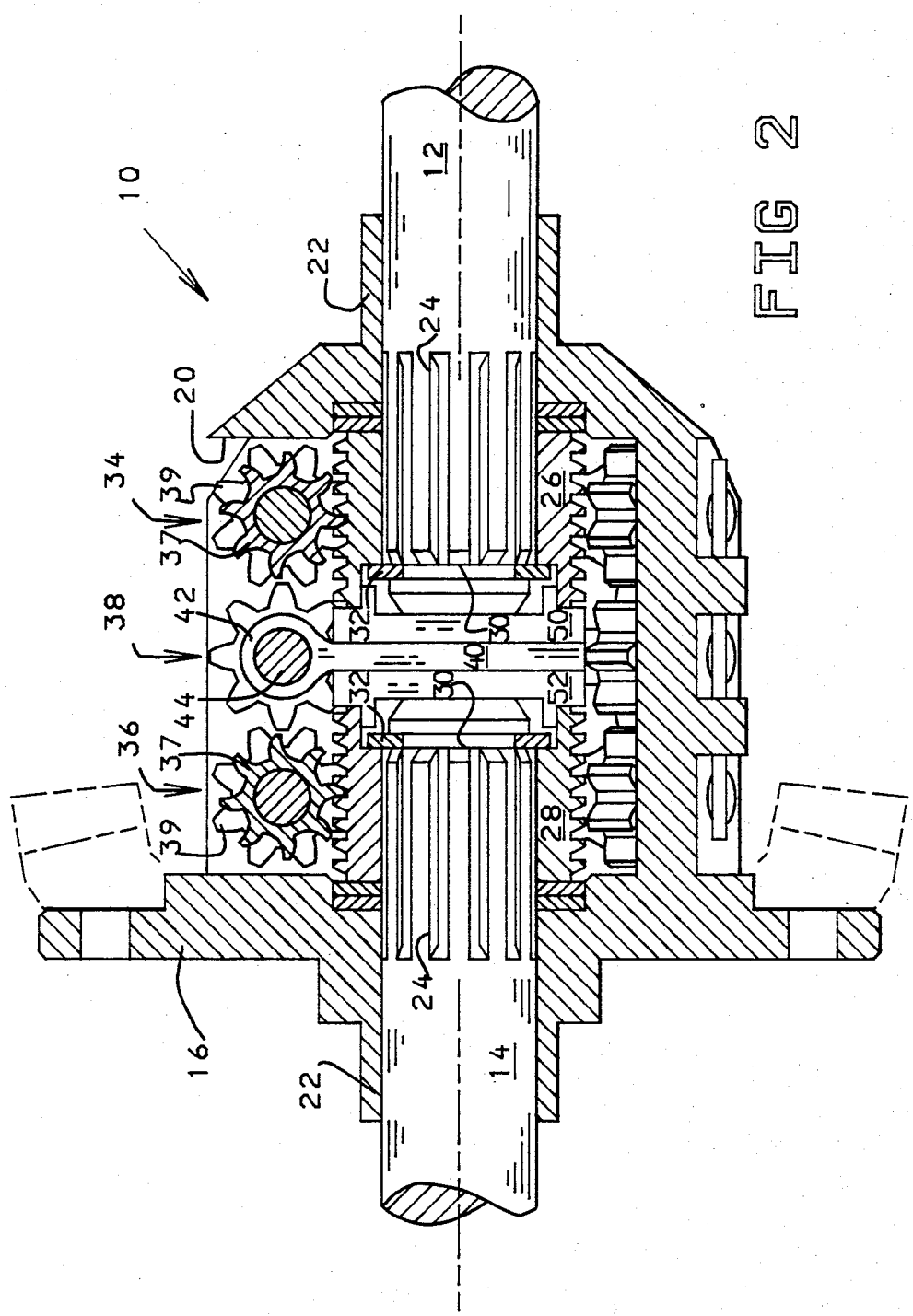
FIG. 2 is an elevational view in the same scale as FIG. 1 and partly in cross-section, showing the differential assembly of FIG. 1 rotated 90 degrees about its horizontal axis.

Referring to FIGS. 1 and 2, the differential assembly 10 of the invention is illustrated as comprising a housing formed as a unitary structure for carrying a number of gear components and axle segments 12 and 14 of an axle assembly for a vehicle. The housing of the differential assembly 10 includes a flange 16 formed thereon for receiving a conventional ring gear 18 (shown in phantom) for being driven by a hypoid gear (not shown) of a main drive train of the vehicle. In fabricating the housing, any known method of fabrication may be utilized, including building up of the housing from separate units, but in the illustrated embodiment, the housing is cast as a single unit. In such a construction, major openings 20 are formed through the cast housing to define a relatively open interior space for receiving inner ends of axle segments 12 and 14 and associated gear components. Opposite ends of the housing include journals 22 which define bores into which the ends of the axle segments 12 and 14 are inserted.

As shown in FIG. 2, the innermost ends of the axles segments 12 and 14 are provided with splines 24 for securing separate drive gears 26 and 28 to the axle ends. Each drive gear is associated with a respective axle end and is secured thereto so as to rotate the axle ends with the rotation of the entire housing or through differentiating action between the axle ends. In addition, each axle end is provided with an annular groove 30 for receiving locking rings or C-shaped fasteners 32.

Figure 3:
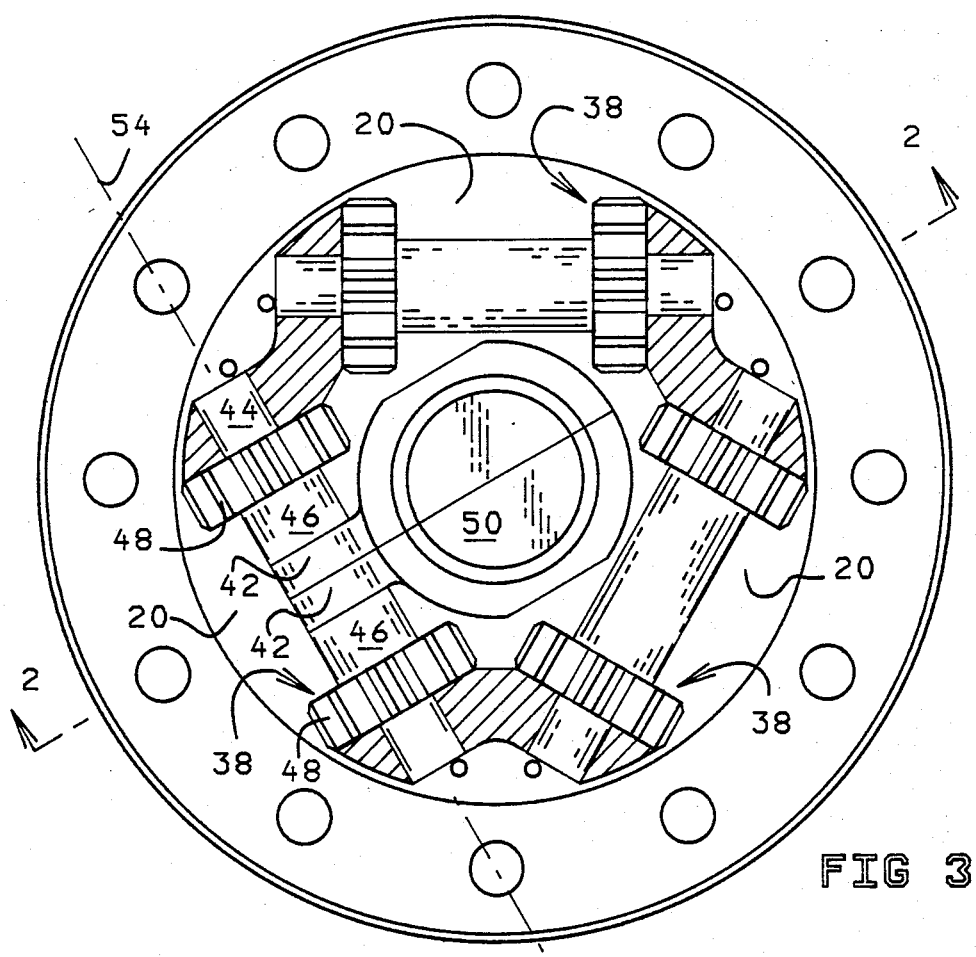
FIG. 3 is an end view, partly in cross section, of the type of differential assembly shown in FIGS. 1 and 2, as seen on line 3—3 of FIG. 1.

At least one pair (and in the illustrated embodiment, three pair are utilized) of transfer gears are provided for dividing torque between the separate axle ends of the axle segments 12 and 14. A pair of transfer gears consists of a gear 34 associated with a drive gear 26 and a separate drive gear 36 associated with the other drive gear 28. The transfer gears 34 and 36 are of the general geometry shown in FIG. 1 in which each transfer gear has a central worm wheel portion 37 for meshing with the worm teeth of associated drive gears, as described in U.S. Pat. No. 2,859,641. In addition, each transfer gear 34 and 36 is provided with spur gears 39 formed (or secured) at each end thereof for transmitting motion of the transfer gear to an opposite end of the differential assembly. Although a pair of transfer gears, such as the transfer gears 34 and 36 may be arranged with their spur gears 39 in direct driving relationship with each other, the illustrated embodiment shows an arrangement wherein an idler gear 38 is inserted between the pair of transfer gears 34 and 36 to allow a transfer of driving motion from one end of the differential case to the other. The purpose of the intermediate gear 38 is to provide for a part of the assembly which can be easily removed to thereby provide access to a central portion of the interior of the assembly. This, in turn, permits the installation and removal of a spacing member 40 which is the characterizing feature of the present invention. As shown in FIG. 3, additional idler gears are provided between remaining pairs of transfer gears in any given assembly, however, it is contemplated that only one idler gear need be removable for purposes of installing and removing the spacing member 40.

The basic arrangement of gear components, including the drive gears, transfer gears and idler gears, as discussed above, have been described in the prior art or in patent applications which accompany the filing of the present application. In addition, it is known to provide some form of spacing block between the ends of axles for non bevel gear differential units, as evidenced by U.S. Pat. No. 4,365,524. However, the spacing member of the present invention is believed to provide a relatively simple construction for easy installation and removal from the specific type of differential assembly illustrated in FIGS. 1-3.

Figure 4:
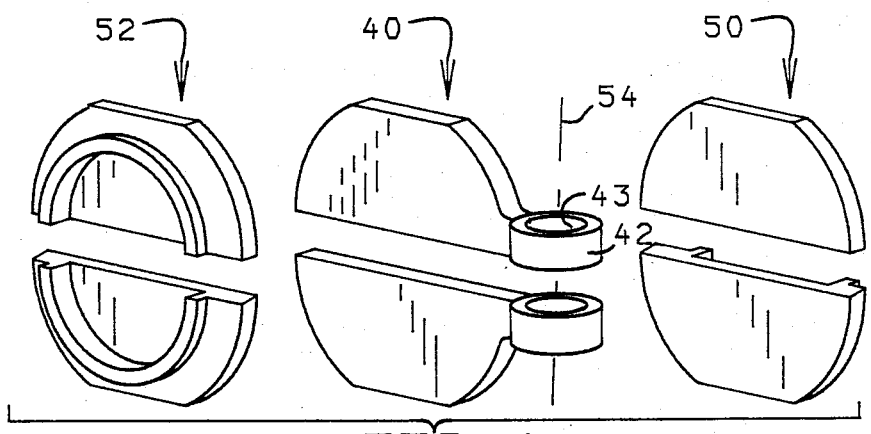
FIG. 4 is an exploded view of a preferred spacing member assembly for use with the differential shown in FIGS. 1-3.

Although the spacing member 40 will be referred to as a single member, it is to be understood that the spacing member may take on many shapes and forms other than a unitary construction and may include the additional elements illustrated in FIG. 4. In the FIG. 4 arrangement, the spacing member 40 is shown as being made up of two sets of components which are formed as a result of breaking or splitting the spacing member 40 in a plane which generally passes through a center axis 15 of the differential assembly. By dividing the spacing member into two parts, the separate components are more easily inserted and removed from the confined interior of the differential assembly. FIG. 4 also illustrates a mounting element 42 associated with the spacing member 40. The mounting element 42 projects radially outwardly from the surface of the spacing member 40 and includes a bore 43 therethrough for receiving a journal pin 44 (see FIG. 3) associated with the mounting of an idler gear 38 carried thereon. As illustrated, the divided components which make up the spacing member 40 are designed so that each carries one half of the mounting element 42, and thus, when the two elements are assembled together, the journal pin 44 can function as a securing means for holding the spacing member in a preferred position within the interior of the differential assembly. Once the spacing member 40 is assembled and inserted in place, the position defined for it is at an approximate mid point between the two axle ends, as shown in FIG. 2. As shown in FIGS. 1 and 3, separate sleeves 46 are carried on the journal pin 44 for defining the position of the mounting elements 42 and the spur gear portions 48 which are carried in positions for meshing with the spur gear portions 39 of the transfer gears 34 and 36.

Additional spacing elements 50 and 52 may be included with the spacing member of this invention for defining cup-shaped faces which embrace the ends of associated axles and which serve to retain the locking rings 32 in their locking positions. These cup-shaped faces are formed as separate disk-shaped elements 50 and 52 which are themselves split into two separate parts, as illustrated, for ease of installation and removal of the various components. Alternatively, each of the disk-shaped elements 50 and 52 may be formed as a unitary structure, provided the main spacing number 40 is designed to be easily removed prior to removal of the elements 50 and 52. Either way, the requirement is to provide a sufficient thickness of material to maintain the respective axle ends in their outwardly directed positions so that they cannot move inwardly toward the interior of the differential assembly during normal operation of the vehicle.

Another way of describing the spacing member of this invention is with reference to various axes set for components included within the differential assembly. Thus, the radially projecting mounting element 42 of the spacing member 40 can be described as having a bore 42 which has a center axis 54 (FIG. 4) that is positioned at a right angle to, and offset from, the common center axis 15 of the axle segments 12 and 14. The axis 54 of the bore 42 is also a center axis of the journal pin 44 which is inserted through the bore for securing the spacing member 40 in its preferred position. Likewise, the plane in which the components of the spacing member are split (as shown in FIG. 4) can be described as being perpendicular to the axis 54 of the bore.

Although the invention has been described with reference to a preferred embodiment thereof, it can be appreciated that variations in design, dimensions, and geometry can be made in the basic concepts which have been disclosd. All such variations as would be obvious to a person skilled in this art or which would be equivalent to those described herein are intended to be included within the scope of the claims which follow.

What is claimed is:

1. In a differential assembly of the type which includes a differential case having means for receiving a pair of axle ends together with a pair of drive gears coupled to said pair of axle ends for rotation therewith, and including spacing means for limiting axial thrust of said axle ends towards each other within said differential assembly, said spacing means comprising a spacing member which can be removably installed between said axle ends so as to define a predetermined spacing between said axle ends within said differential case, said spacing member having a mounting element projecting radially outwardly therefrom for securing said spacing member in its installed position between said axle ends, and securing means for fixing the position of said mounting element relative to said differential case, said securing means comprising a journal pin removably mounted across an access opening formed through said differential case, and including a bore through said mounting element of said spacing means for receiving said journal pin when (a) the spacing means is inserted through the access opening and into its installed position and (b) the said journal pin is mounted in its installed position, to thereby fix the position of said spacing means within said differential case, the improvement wherein the center axis of said bore is perpendicular to and offset from the center axis of said axle ends.

2. The improvement of claim 1 wherein said spacing member is split in a plane which generally passes through the center axis of said axle ends and is perpendicular to the center axis of said bore so as to provide two separate elements which can be easily removed from the differential case but which each include a mounting element portion having a bore therethrough, whereby the separate elements are held together in an installed position when said journal pin is placed through the aligned bores of the mounting element portions thereof.

3. The improvement of claim 2 and including two additional spacing elements for positioning between said spacing member and said axle ends, said additional spacing element being each shaped to embrace an end portion of an associated axle end so as to contain a locking ring carried by said axle end.

4. The improvement of claim 1, wherein said journal pin also carries intermediate gear means for meshing with a separate transfer gear associated with each of the drive gears of said differential assembly.

5. In a differential assembly, the combination comprising a differential case including means for receiving a pair of axle ends, drive gears disposed within said differential case and rotatably coupled to said axle ends, at least one transfer gear associated with each drive gear, said transfer gears rotatably carried by said differential case and arranged in pairs such that a first transfer gear associated with one drive gear is paired with a second transfer gear associated with the other drive gear, an intermediate gear means rotatably coupling said first transfer gear with said second transfer gear, said intermediate gear being carried by a journal pin which is removably mounted across an access opening formed through said differential case so that removal of said journal pin and said intermediate gear means carried thereby provides access to the interior of said differential case, and a spacing member which can be removably installed between said axle ends so as to define a predetermined spacing between said axle ends within said differential case, said spacing member having a mounting element projecting radially outwardly therefrom for securement to said journal pin of said intermediate gear means.

6. The combination of claim 5 wherein said mounting element includes a bore therethrough for receiving said journal pin.

7. The differential case of claim 5 wherein said window wall sections and said intermediate wall sections are formed by driving a broach having cutting teeth sized to define the spaced apart distance for said window wall sections and said intermediate wall sections, into one of said transfer gear windows and moving it along a path defined by said aligned transfer gear windows.

8. The combination of claim 7 wherein each of said separate elements is generally semi-circular in shape so as to define a disk-shaped spacing member for insertion between said axle ends.

9. The combination of claim 7 wherein said spacing member is shaped to embrace a portion of said axle ends so as to contain a locking ring mounted on each axle end.

* * * * *

UNITED STATES PATENT OFFICE
CERTIFICATE OF CORRECTION

PATENT NO. : 4,512,211
DATED : April 23, 1985
INVENTOR(S) : Gene A. Stritzel

It is certified that error appears in the above-identified patent and that said Letters Patent are hereby corrected as shown below:

In Column 5, line 56, delete "disclosd" and substitute --disclosed--.

In Column 6, line 66 through Column 7, line 5, delete claim 7 in its entirety and substitute the following claim 7 of record --7. The combination of claim 6 wherein said spacing member is split in a plane which generally passes through a center axis of said axle ends and is perpendicular to the center axis of said bore so as to provide two separate elements which can be easily removed from the differential but which each include a portion of said mounting element and its contained bore.--

Signed and Sealed this

Thirteenth Day of August 1985

[SEAL]

Attest:

DONALD J. QUIGG

Attesting Officer        Acting Commissioner of Patents and Trademarks